United States Patent
Yaoita et al.

(10) Patent No.: US 10,139,799 B2
(45) Date of Patent: Nov. 27, 2018

(54) CONTROLLER TO MODIFY AN EXECUTION CONDITION DURING PROGRAM EXECUTION

(71) Applicant: OMRON Corporation, Kyoto-shi, Kyoto (JP)

(72) Inventors: Koji Yaoita, Kyoto (JP); Tatsuya Kojima, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 185 days.

(21) Appl. No.: 15/123,061

(22) PCT Filed: Jan. 14, 2015

(86) PCT No.: PCT/JP2015/050798
§ 371 (c)(1),
(2) Date: Sep. 1, 2016

(87) PCT Pub. No.: WO2015/136960
PCT Pub. Date: Sep. 17, 2015

(65) Prior Publication Data
US 2017/0075334 A1  Mar. 16, 2017

(30) Foreign Application Priority Data
Mar. 13, 2014 (JP) ................. 2014-049974

(51) Int. Cl.
G05B 11/01 (2006.01)
G05B 19/05 (2006.01)
G06F 9/48 (2006.01)

(52) U.S. Cl.
CPC ........... *G05B 19/05* (2013.01); *G06F 9/4843* (2013.01); *G05B 2219/13086* (2013.01)

(58) Field of Classification Search
CPC .............................. G05B 19/05; G06F 9/4843
(Continued)

(56) References Cited

U.S. PATENT DOCUMENTS 3,363,234 A * 1/1968 Erickson ............... G06F 15/161
709/238
6,263,487 B1 * 7/2001 Stripf ................... G05B 19/056
717/171
(Continued)

FOREIGN PATENT DOCUMENTS

CN 102792237 A 11/2012
CN 103080858 A 5/2013
(Continued)

OTHER PUBLICATIONS

Chmiel, Miroslaw, and Edward Hrynkiewicz. "Concurrent operation of processors in the bit-byte CPU of a PLC." Control and Cybernetics 39 (2010): pp. 559-579.*
(Continued)

*Primary Examiner* — Satish Rampuria
(74) *Attorney, Agent, or Firm* — Metrolexis Law Group, PLLC (57) ABSTRACT

A controller, such as a PLC, stores a task execution condition management table that indicates execution conditions for tasks and executes programs periodically in accordance with the execution conditions for the tasks. The controller provides a setting instruction for modifying the execution conditions for the tasks. A user enters the setting instruction in a user program by using a support device, for example. The controller updates the task execution condition management table with regard to a task associated with the instruction by executing the instruction for modifying the execution conditions for the tasks, including priorities of the tasks and cycles of the tasks, contained in the user program, and executes the programs in accordance with the updated execution conditions for the tasks.

4 Claims, 9 Drawing Sheets

(58) Field of Classification Search
USPC .................................................. 700/1–37
See application file for complete search history.

(56) References Cited

U.S. PATENT DOCUMENTS

| | | | |
|---|---|---|---|
| 7,139,618 B2 * | 11/2006 | Danz | G05B 19/042 700/23 |
| 2001/0023470 A1 | 9/2001 | Tomita | |
| 2007/0162157 A1 * | 7/2007 | Chandhoke | G05B 19/056 700/17 |
| 2011/0089928 A1 * | 4/2011 | O'Gorman | H02M 3/157 323/318 |
| 2012/0029659 A1 | 2/2012 | Taira et al. | |
| 2012/0239201 A1 | 9/2012 | Kobayashi et al. | |
| 2014/0012402 A1 | 1/2014 | Nishiyama et al. | |

FOREIGN PATENT DOCUMENTS

| | | |
|---|---|---|
| CN | 103403633 A | 11/2013 |
| EP | 2672346 A1 | 12/2013 |
| JP | H6-259115 A | 9/1994 |
| JP | H9-62317 A | 3/1997 |
| JP | H09-251389 A | 9/1997 |
| JP | H10-74105 A | 3/1998 |
| JP | H10-133889 A | 5/1998 |
| JP | H11-338447 A | 12/1999 |
| JP | 2000-132207 A | 5/2000 |
| JP | 2001-265412 A | 9/2001 |
| JP | 2003-181900 A | 7/2003 |
| JP | 2004-151762 A | 5/2004 |
| JP | 2004-272781 A | 9/2004 |
| JP | 4894961 B1 | 3/2012 |

OTHER PUBLICATIONS

Brennan, Robert William, Martyn Fletcher, and Douglas H. Norrie. "An agent-based approach to reconfiguration of real-time distributed control systems." IEEE transactions on Robotics and Automation 18.4 (2002): pp. 444-451.*

Chmiel, Miroslaw, Edward Hrynkiewicz, and Adam Milik. "Compact PLC with event-driven program tasks execution." IFAC Proceedings vols. 39.17 (2006): pp. 99-104.*

Chinese Office Action (CNOA) dated Mar. 8, 2018 in a counterpart Chinese patent application.

Japanese Office Action dated Sep. 26, 2017 in a counterpart Japanese patent application.

Japanese Office Action (JPOA) dated May 8, 2018 in a counterpart Japanese patent application.

* cited by examiner

| Task execution condition management table | | |
|---|---|---|
| Task name | Execution priority | Task cycle |
| Task 1 | High | T1 |
| Task 2 | High | T1 |
| Task 3 | High | T1 |
| Task 4 | Middle | T2 |
| Task 5 | Middle | T2 |
| Task 6 | Middle | T3 |
| Task 7 | Low | T2 |
| Task 8 | Low | T3 |

CONTROLLER TO MODIFY AN EXECUTION CONDITION DURING PROGRAM EXECUTION

TECHNICAL FIELD

The present invention relates to a control system including a control device that executes a user program periodically or in an "event-like" manner, and relates to an information processing device in the control system.

BACKGROUND ART

Machines and facilities used on many production sites are controlled by control systems. A typical control system includes a programmable logic controller (also abbreviated below as a "PLC") or other control device (controller) as a main constituent element.

A PLC includes a plurality of units. For example, the plurality of units include: a central processing unit (CPU) unit includes a microprocessor that executes a user program; and an input and output (I/O) unit takes charge of receiving a signal from an external switch or sensor and outputting a signal to an external relay or actuator. The PLC performs a control operation while swapping data between the units via a PLC system bus and/or a field network in execution cycles of the user program.

The CPU unit in the PLC executes the user program, a system program, and other programs in accordance with the assignment of tasks. Examples of processes performed as tasks by the PLC include: I/O refresh in which the CPU unit performs data input/output for a slave apparatus or the I/O unit; the execution of the user program; motion control that receives an instruction from the user program and executes it; a data trace process; and other processes.

Tasks include a fixed cycle task and an event task; the fixed cycle task is repeatedly and periodically performed by the PLC, and the event task is performed by the PLC only once when a preset condition is satisfied. Each task has an execution priority and a task cycle assigned thereto. The CPU unit executes individual programs in accordance with the priorities of tasks.

An exemplary PLC that operates in accordance with the assignments of tasks is in Japanese Patent No. 4894961 (Patent Document 1), for example. Patent Document 1 describers a CPU unit in the PLC which, in view of an incident in which an execution time of a control program may be prolonged randomly and intermittently. More specifically, the CPU unit sets a communication period required to input or output control data to a preset time, which is shorter than the maximum execution time of a control program. According to the description of Patent Document 1, if a program having a high priority for task execution and a program having a low priority are present, the CPU unit executes the high-priority program within a preset cycle time and, after having completed this execution, executes the low-priority program.

PRIOR ART DOCUMENT

Patent Document

Patent Document 1: Japanese Patent No. 4894961

SUMMARY OF THE INVENTION

Problems to be Solved by the Invention

In some cases, however, a priority and a cycle time of a program, for example, change with a usage condition of the controller. As an example, different priorities and cycle times may be required for a program when the controller starts up, when the controller communicates with a host system, and when the controller needs to perform a process at a high speed.

An object of the present invention is to provide a technique associated with a controller, which enables execution conditions for executing a program to be modified even when the program is in operation, thereby improving user's convenience.

Means for Solving the Problem

A controller according to an aspect of the present invention controls a target apparatus. The controller includes: a storage section configured to store a plurality of programs including a user program and task information indicating an execution condition for a task; and a control section configured to execute the programs periodically in accordance with the execution condition indicated by the task information. The controller controls the target apparatus by causing the control section to perform the user program periodically. The user program can contain a setting instruction for modifying the execution condition for the task. The control section updates the task information in the storage section by executing the setting instruction contained in the user program, and executes the programs in accordance with the updated execution condition for the task.

The execution condition indicated by the task information may preferably contain a priority of the task to be executed. The control section may preferably execute the programs periodically in accordance with the priority of the task. The setting instruction may preferably contain an instruction for modifying the priority of the task. The control section may preferably update the task information by executing the instruction for modifying the priority of the task which is contained in the user program to modify the priority of the task associated with the instruction.

The execution condition indicated by the task information may preferably contain a cycle of the task is to be executed. The setting instruction may preferably contain an instruction for modifying the cycle of the task is to be executed. The control section may preferably update the task information by executing the instruction for modifying the cycle of the task which is contained in the user program to modify the cycle of the task associated with the instruction.

The execution condition indicated by the task information may preferably contain a priority of the task to be executed and a cycle of the task is to be executed. The control section may preferably execute the programs periodically in accordance with the priority and cycle of the task. The setting instruction may preferably contain at least one of an instruction for modifying the priority of the task and an instruction for modifying the cycle of the task. The control section may preferably update the task information by executing the instruction for modifying the priority of the task and the instruction for modifying the cycle of the task which are contained in the user program to modify at least one of the priority and cycle of the task associated with the instruction.

Effect of the Invention

According to the present invention, it is possible to modify, from a user program, priorities of programs to be executed and cycles in which the programs operate a controller, thereby operating the controller efficiently.

MODE FOR CARRYING OUT THE INVENTION

An embodiment of the present invention will be described in detail with reference to the drawings. The same reference symbols are given to identical or corresponding parts in the drawings, and descriptions of these will not be repeated.

<A. System Configuration>

First, a description will be given of a system configuration of a control system according to this embodiment. In the embodiment, a programmable logic controller (PLC) that controls a control target, such as a machine or facility, is described as a typical example of a control device. However, the control device according to the present invention is not limited to a PLC and is applicable to different types of control devices.

Figure 1:
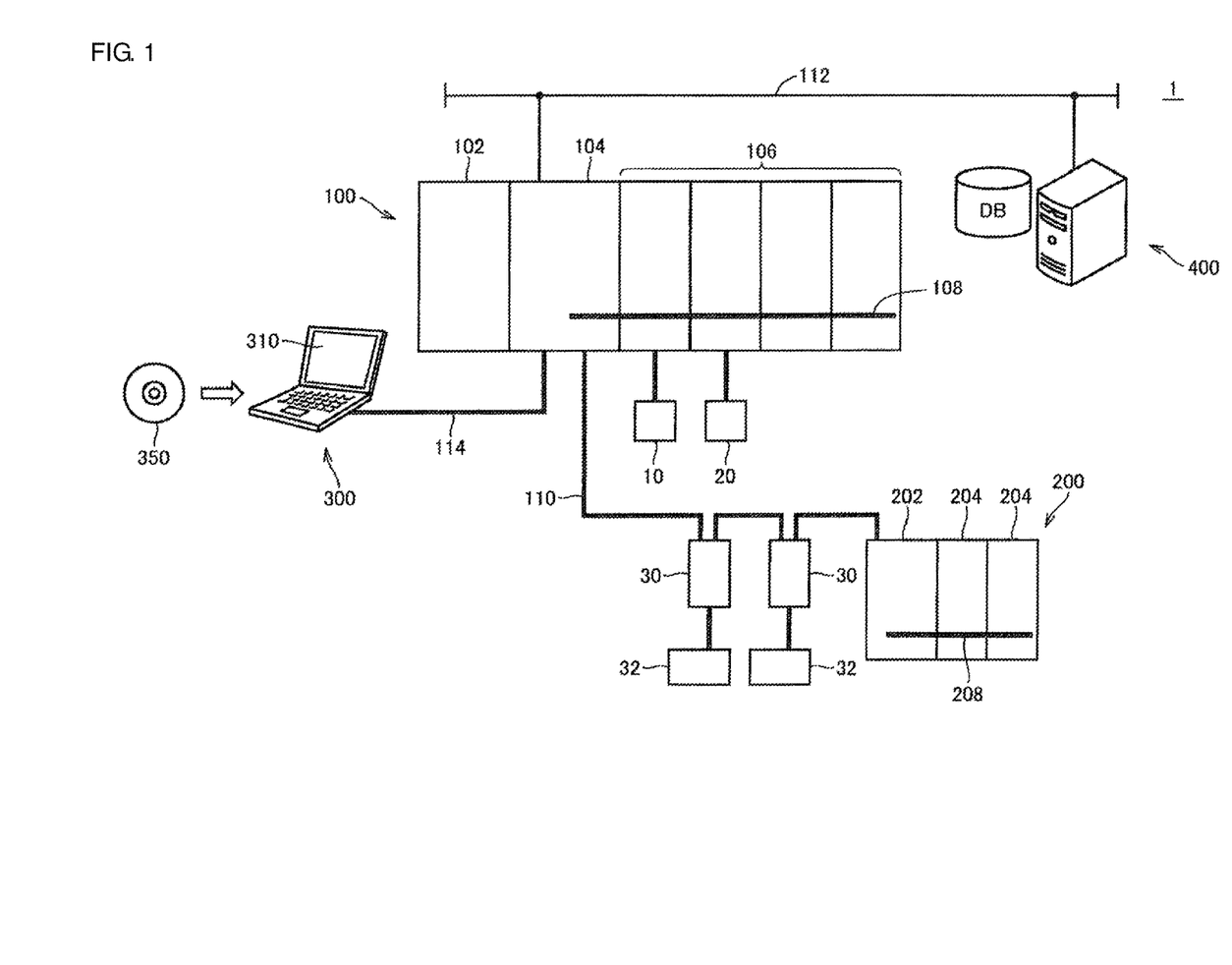
FIG. 1 is a schematic view of a system configuration of a control system 1 according to this embodiment.

FIG. 1 is a schematic view of a system configuration of a control system 1 according to this embodiment. Referring to FIG. 1, the control system 1 includes: a PLC 100; a support device 300 connected to the PLC 100; and a database device 400 to be accessed by the PLC 100. The PLC 100 executes a user program, as will be described later, periodically or in an event-like manner. This user program can contain an access instruction, and the PLC 100 can access the database device 400 in accordance with this access. In this way, the PLC 100 can transmit/receive data to or from the database device 400 via a network 112, such as Ethernet (registered trademark).

The support device 300 is a typical example of an information processing device connectable to the PLC 100. The support device 300 is connected to the PLC 100 via a connection cable 114, and provides functions, such as setting of various parameters, programming, monitoring, and debugging, between the support device 300 and the PLC 100. In a typical case, the PLC 100 and the support device 300 can communicate with each other in conformity with universal serial bus (USB) specifications.

The PLC 100 includes: a CPU unit 104 that performs control and computing; and one or more input/output (I/O) units 106. These units can swap data via a PLC system bus 108. The units are supplied with power of an appropriate voltage from a power supply unit 102.

In the control system 1, the PLC 100 transmits data to various field apparatuses or receives data from the field apparatuses via the I/O units 106 (to which the PLC 100 is connected via the PLC system bus 108) and/or a field bus 110. These field apparatuses include: an actuator that subjects a control target to any given process; and a sensor that acquires various information from the control target. In FIG. 1, examples of the field apparatuses include: a detection switch 10; a relay 20; and servomotor drivers 30 that drive corresponding motors 32. The PLC 100 is further connected to a remote I/O terminal 200 via the field bus 110. The remote I/O terminal 200 basically performs typical processes associated with an I/O process, similar to the I/O units 106. More specifically, the remote I/O terminal 200 includes: a communication coupler 202 that performs processes associated with data transfer over the field bus 110; and one or more I/O units 204. These units can swap data via a remote I/O terminal bus 208.

<B. Configuration of PLC 100>

Figure 2:
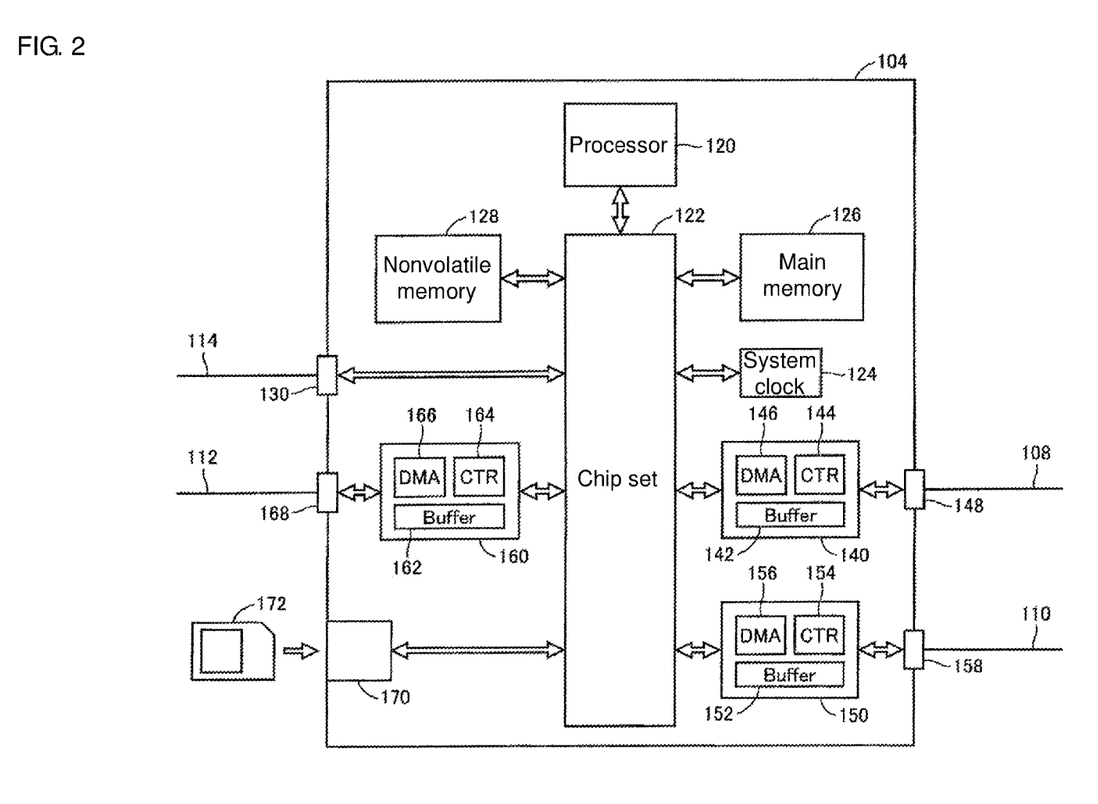
FIG. 2 is a schematic view of a hardware configuration of the main section in a PLC 100 according to this embodiment.
Figure 3:
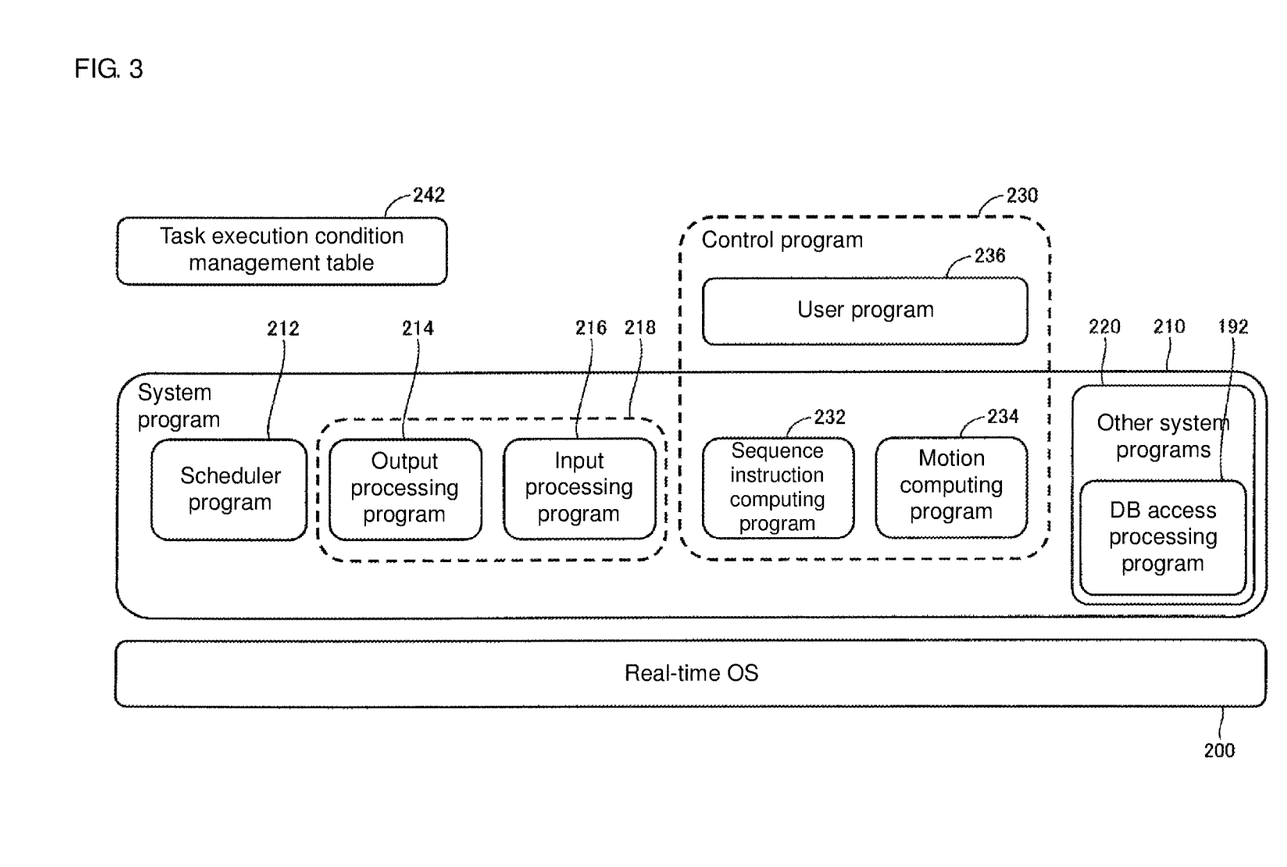
FIG. 3 is a schematic view of a software configuration of the PLC 100 according to this embodiment.

Next, a description will be given of a configuration of the PLC 100 according to this embodiment. FIG. 2 is a schematic view of a hardware configuration of the main section in the PLC 100 according to this embodiment. FIG. 3 is a schematic view of a software configuration of the PLC 100 according to this embodiment.

A description will be given of a hardware configuration of the CPU unit 104 in the PLC 100, with reference to FIG. 2. The CPU unit 104 includes a processor 120, a chip set 122, a system clock 124, a main memory 126, a nonvolatile memory 128, a USB connector 130, a PLC system bus controller 140, a field bus controller 150, a host communication controller 160, and a memory card interface 170. The chip set 122 is coupled to the other components via various buses.

Configurations of the processor 120 and the chip set 122 typically conform to general-purpose computer architecture. More specifically, the processor 120 interprets instruction codes sequentially supplied from the chip set 122 in accordance with an internal clock and executes the interpreted instruction codes. The chip set 122 transmits/receives internal data to or from the various components to which the chip set 122 is connected and generates an instruction code required for the processor 120. The system clock 124 generates a system clock having a predetermined period and applies this system clock to the processor 120. The chip set 122 has a function of cashing data, for example acquired as a result of performing a computing process in the processor 120.

The main memory 126 and the nonvolatile memory 128 are possessed by the CPU unit 104 as storage sections. The main memory 126 is a volatile storage area and retains various programs to be executed by the processor 120. In addition, the main memory 126 is used as a working memory when the various programs are executed. The nonvolatile memory 128 retains an operating system (OS), a system program, the user program, data definition information, log information, and other data in a nonvolatile manner.

The USB connector 130 is an interface via which the support device 300 is connected to the CPU unit 104. The CPU unit 104 normally captures, for example an executable program that has been transferred from the support device 300 via the USB connector 130.

The PLC system bus controller 140, the field bus controller 150, and the host communication controller 160 are possessed by the CPU unit 104 as communication sections. These communication circuits transmit and receive data.

The PLC system bus controller 140 controls transmission and reception of data over the PLC system bus 108. More specifically, the PLC system bus controller 140 includes a buffer memory 142, a PLC system bus control circuit 144, and a dynamic memory access (DMA) control circuit 146. The PLC system bus controller 140 is connected to the PLC system bus 108 via a PLC system bus connector 148.

The field bus controller 150 includes a buffer memory 152, a field bus control circuit 154, and a DMA control circuit 156. The field bus controller 150 is connected to the field bus 110 via a field bus connector 158. The host communication controller 160 includes a buffer memory 162, a host communication control circuit 164, and a DMA control circuit 166. The host communication controller 160 is connected to the network 112 via a host communication connector 168.

The memory card interface 170 allows the processor 120 to be connected to a memory card 172 removably attached to the CPU unit 104.

<C. Software Configuration of CPU Unit>

A description will be given of a software group that provides various functions according to this embodiment, with reference to FIG. 3. Instruction codes contained in the software are read at appropriate timings and executed by the processor 120 in the CPU unit 104.

FIG. 3 is a schematic view of a software configuration to be executed by the CPU unit 104 according to the embodiment of the present invention. Referring to FIG. 3, the software to be executed by the CPU unit 104 has a three-layered structure constituted by a real-time OS 200, a system program 210, and a user program 236.

The real-time OS 200 is designed in accordance with the computer architecture of the CPU unit 104 and provides a basic execution environment under which the processor 120 executes the system program 210 and the user program 236. In a typical case, the real-time OS may be supplied from a PLC maker or a dedicated software firm.

The system program 210 is a software group that provides the function of the PLC 100. More specifically, the system program 210 includes a scheduler program 212, an output processing program 214, an input processing program 216, a sequence instruction computing program 232, a motion computing program 234, and other system programs 220. In a typical case, the output processing program 214 and the input processing program 216 are sequentially executed (as a single unit). So, both of the output processing program 214 and the input processing program 216 may be collectively referred to as the I/O processing program 218.

The user program 236 is created in accordance with a control object of a user. More specifically, the user program 236 is a program designed arbitrarily in accordance with a target line (process) to be controlled using the control system 1.

As will be described later, the user program 236 accomplishes a control object of a user by cooperating with the sequence instruction computing program 232 and the motion computing program 234. More specifically, the user program 236 achieves a programmed operation by using, for example instructions, functions, and functional modules provided by the sequence instruction computing program 232 and the motion computing program 234. For this reason, the user program 236, the sequence instruction computing program 232, and the motion computing program 234 may be collectively referred to as the control program 230.

As described above, the processor 120 in the CPU unit 104 executes the system program 210 and the user program 236 stored in the storage section.

The individual programs will be described below in more detail.

As described above, the user program 236 is created in accordance with a user's control object (e.g., a target line or process). The user program 236 may be typically in an object program format executable by the processor 120 in the CPU unit 104. The support device 300 or the like compiles a source program described in a ladder language or other language, thereby generating the user program 236. The user program 236 in an object program format generated in this manner is transferred from the support device 300 to the CPU unit 104 via the connection cable 10. Then, the user program 236 may be stored in the nonvolatile memory 128, for example.

The scheduler program 212 controls each of the output processing program 214, the input processing program 216, and the control program 230 to start a process in individual execution cycles and to resume a process after an interruption. In short, the scheduler program 212 controls execution of tasks. In this case, programs (I/O processing program 218, control program 230, etc.) assigned to a task are sequentially executed.

The scheduler program 212 controls the execution sequence of processes in these programs, in accordance with set execution conditions for tasks, including set priorities of the tasks and set cycles of the tasks. The set execution conditions for tasks are managed in a task execution condition management table 242 that will be described later. The control system 1 in this embodiment has been given an instruction (setting instruction) for modifying execution conditions for tasks, including execution priorities of the tasks and execution cycles of the tasks. This instruction can be contained in the user program 236. The CPU unit 104 executes the instruction for modifying execution conditions for tasks which is contained in the user program 236, thereby modifying priorities of the tasks and cycles of the tasks, for example. In this way, the control system 1 can modify priorities of tasks from the user program.

The output processing program 214 changes an arrangement of output data generated as a result of executing the user program 236 (control program 230) so that the output data is in a format suitable for a transfer to the PLC system bus controller 140 and/or the field bus controller 150. If the PLC system bus controller 140 or the field bus controller 150 requires an instruction for performing the transmission from the processor 120, the output processing program 214 may issue this instruction.

The input processing program 216 changes an arrangement of input data received by the PLC system bus controller 140 and/or the field bus controller 150 so that the input data is in a format suitable for use in the control program 230.

The sequence instruction computing program 232 is a program that is called in response to execution of a certain type of sequence instruction used in the user program 236 and is executed to achieve a content of this instruction.

The motion computing program 234 is a program that is executed in accordance with an instruction in the user program 236 and calculates command values to be output to motor drivers, such as the servomotor drivers 30 and pulse motor drivers.

The other system programs 220 are a program group illustrated collectively and fulfill various functions of the PLC 100; the individual programs illustrated in FIG. 3 are excluded from the other system programs 220. The other system programs 220 include a DB access processing program 192. The DB access processing program 192 contains an instruction code group, which is used to achieve a process required to access the database device 400 in response to execution of the user program 236. The DB access processing program 192 contains an execution code related to an instruction to be designated by the user program 236.

Applicable forms of information used to designate a period of a motion control cycle can include: a time value that indicates the period of the motion control cycle; and information (a number or a letter) that identifies one of a plurality of selections prepared in advance which are related to the period of the motion control cycle.

The real-time OS 200 provides an environment under which a plurality of programs are switched and executed with time. An output preparation interrupt (P) and a field network transmission interrupt (X) are initially set to the PLC 100 according to this embodiment. Each of the output preparation interrupt (P) and the field network transmission interrupt (X) is an event (interrupt) in which output data generated as a result of executing a program in the CPU unit 104 is output (transmitted) to another unit or device. When the output preparation interrupt (P) or the field network transmission interrupt (X) occurs, the real-time OS 200 switches a target to be executed by the processor 120 from a program that is in the curse of the execution at the time of the occurrence of the interrupt to the scheduler program 212.

When neither of the scheduler program 212 and programs to be executed under the control of the scheduler program 212 is executed, the real-time OS 200 executes a program included in the other system programs 210. Examples of this program include: a program related to a process of communication between the CPU unit 104 and the support device 300 over the connection cable 10 (USB); and a program related to a process of communication between the CPU unit 104 and a host device (database device 400, etc.).

<D. Data Structure>

A description will be given of data to be used by the CPU unit 104 with reference to FIG. 4.

Figure 4:
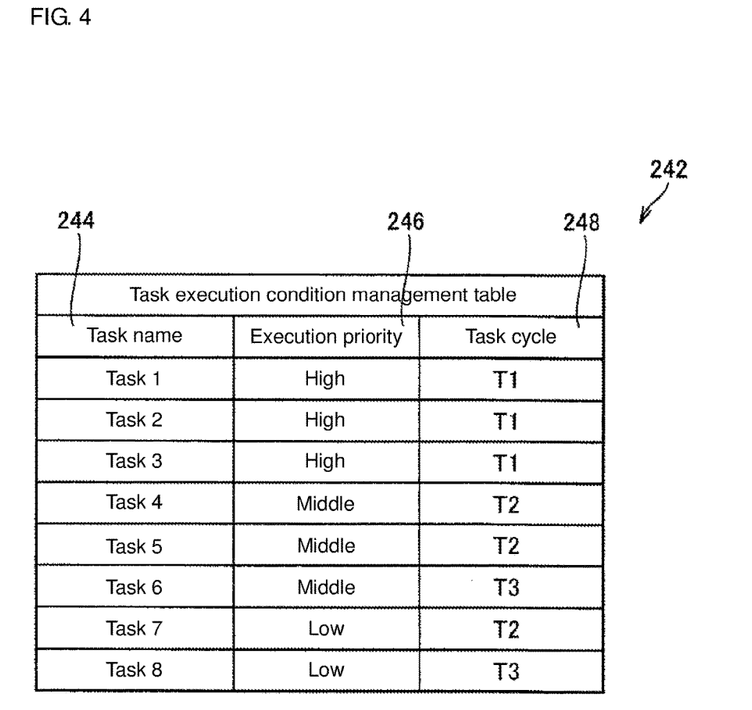
FIG. 4 is a view of a task execution condition management table 242.

FIG. 4 is a diagram illustrating the task execution condition management table 242. As illustrated in FIG. 4, the task execution condition management table 242 lists conditions of tasks to be executed by the CPU unit 104. As an example, the task execution condition management table 242 may list priorities and cycles of tasks to be executed. Records in the task execution condition management table 242 each include a task name 244, a task priority 246, and a task cycle 248.

The task name 244 indicates a name of the task.

The task priority 246 indicates a set value of a priority of a task. Examples of a set value of the priority include "High", "Middle", and "Low"; the "High" denotes the highest priority, the "Middle" denotes the second highest priority, and the "Low" denotes the lowest priority. However, a set value of the priority is not limited to any of these three stages; alternatively, a set value of the priority may be set to any of many more stages.

The task cycle 248 indicates a cycle in which a task is to be executed. For example, a cycle of a task with the priority "High", which denotes the highest priority, may be set as a reference, and cycles of tasks with different priorities may be set to integral multiples of the cycle of the task with the priority "High".

Figure 5:
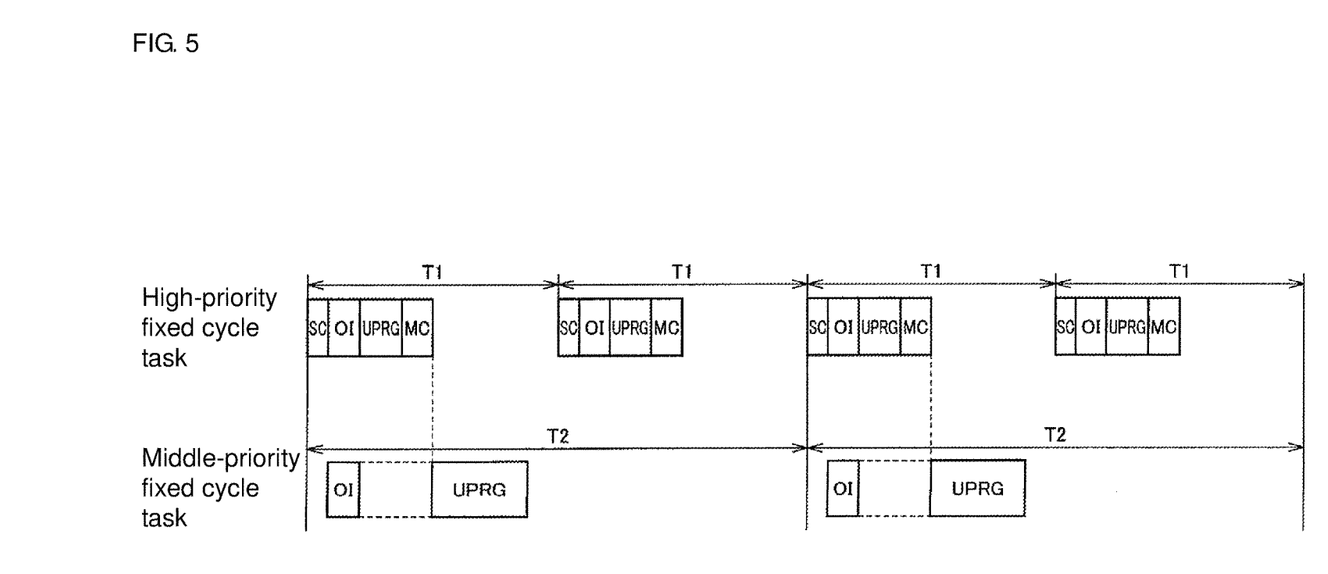
FIG. 5 is a diagram illustrating an exemplary execution sequence of tasks.

FIG. 5 is a diagram illustrating an exemplary execution sequence of tasks. Referring to FIG. 5, the CPU unit 104 executes the fixed cycle tasks under task execution conditions; the first fixed cycle task is set with its set priority being the priority "High" and its cycle being "T1" and the second fixed cycle task is set with its set priority being the priority "Middle" and its cycle being "T2". The fixed cycle task with the priority "High" corresponds to the highest priority task in the CPU unit 104.

When the high-priority fixed cycle task becomes executable during the execution of the fixed cycle task with the priority "Middle", the CPU unit 104 temporarily interrupts the fixed cycle task with the priority "Middle" and in turn executes the fixed cycle task with the priority "High", because a lower priority is assigned to the fixed cycle task with the priority "Middle" than the fixed cycle task with the priority "High". After having completed the fixed cycle task with the priority "High", the CPU unit 104 resumes executing the fixed cycle task with the priority "Middle". In this case, the cycle T2 of the fixed cycle task with the priority "Middle" may be set to an integral multiple of the cycle T1 of the fixed cycle task with the priority "High". FIG. 5 illustrates the case where T2=2T1 (the cycle T2 is set to twice the cycle T1).

In FIG. 5, the mark "SC" denotes a scheduler program. The mark "OI" denotes an output/input processing program. The mark "UPRG" denotes the user program 236. The mark "MC" denotes the motion computing program 234. In FIG. 5, different reference symbols 701 to 707 are assigned to the OIs and the MCs in order to discriminate between them, for the sake of explanation.

During the execution of the PLC 100, at least the output/input processing program (the output processing program 214 and the input processing program 216), the user program 236, and the motion computing program 234 are executable by the processor 120. More specifically, the real-time OS 200 retains the processes (or threads) associated with the individual programs so as to be in an executable state. So, the scheduler program 212 uses the real-time OS 200 and hardware resources (system clock 124, etc.) to execute the programs at appropriate timings and in an appropriate sequence. In this way, the scheduler program 212 controls, for example the start, interruption, and end of the execution of each individual program.

<E. Instruction for Modifying Execution Condition for Task>

A description will be given of an instruction for modifying execution conditions for tasks, which can be contained in the user program 236, with reference to FIG. 6. The PLC 100 in a first embodiment enables an instruction for modifying execution conditions for tasks (set priorities of the tasks and set execution cycles of the tasks) to be contained in the user program 236. The CPU unit 104 in the PLC 100 can execute an instruction for modifying execution conditions for tasks which is contained in the user program 236, thereby modifying one or both of set priorities of the tasks and set execution cycles of the tasks listed in the task execution condition management table 242.

The scheduler program 212 controls an execution sequence of programs in cycles, in accordance with the priorities of the tasks and the cycles of the tasks listed in the task execution condition management table 242. As an example, if a certain condition, such as the completion of a certain process, is satisfied, the scheduler program 212 refers to the task execution condition management table 242 to acquire the priorities of the tasks and the cycles of the tasks. Then, the scheduler program 212 manages an execution sequence of the programs in accordance with the acquired set priorities and cycles of the tasks.

Figure 6:
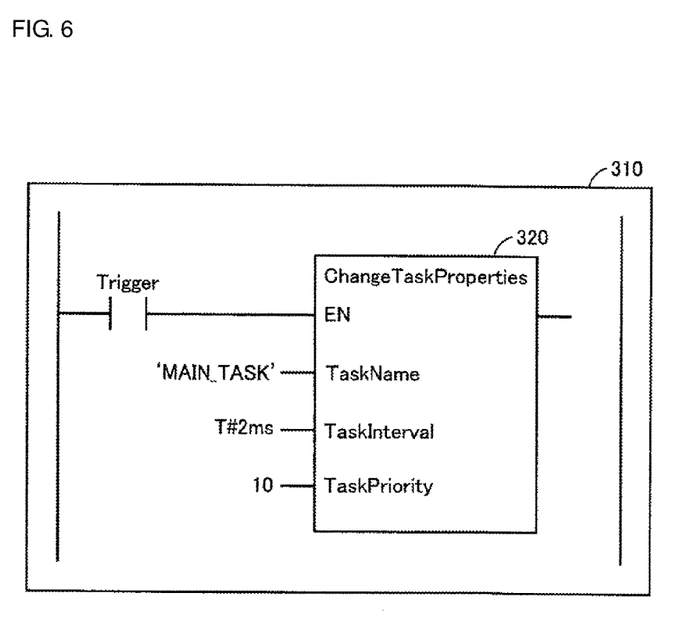
FIG. 6 is a diagram illustrating an exemplary instruction for modifying execution conditions for a task.

FIG. 6 is a diagram illustrating an exemplary instruction for modifying execution conditions for a task. FIG. 6 illustrates an exemplary screen of a display 310 in the support device 300, through which a user edits a task execution condition change instruction 320. As illustrated in FIG. 6, the user can use the instruction "ChangeTaskProperties" for modifying the execution conditions for a task to set the task name "TaskName", the task cycle "TaskCycle", and the task execution priority "TaskPriority". The task execution condition change instruction 320 may be described in a function block form, for example. The CPU unit 104 in the PLC 100 executes the task execution condition change instruction 320, thereby modifying one or both of a priority and an execution cycle of the designated task. In this way, the task execution condition management table 242 can be updated.

<F. Operation>

Next, a description will be given of an exemplary operation in which the CPU unit 104 modifies priorities of tasks by executing an instruction contained in the user program 236.

<F1. Modification of Task Priority from User Program>

Figure 7:
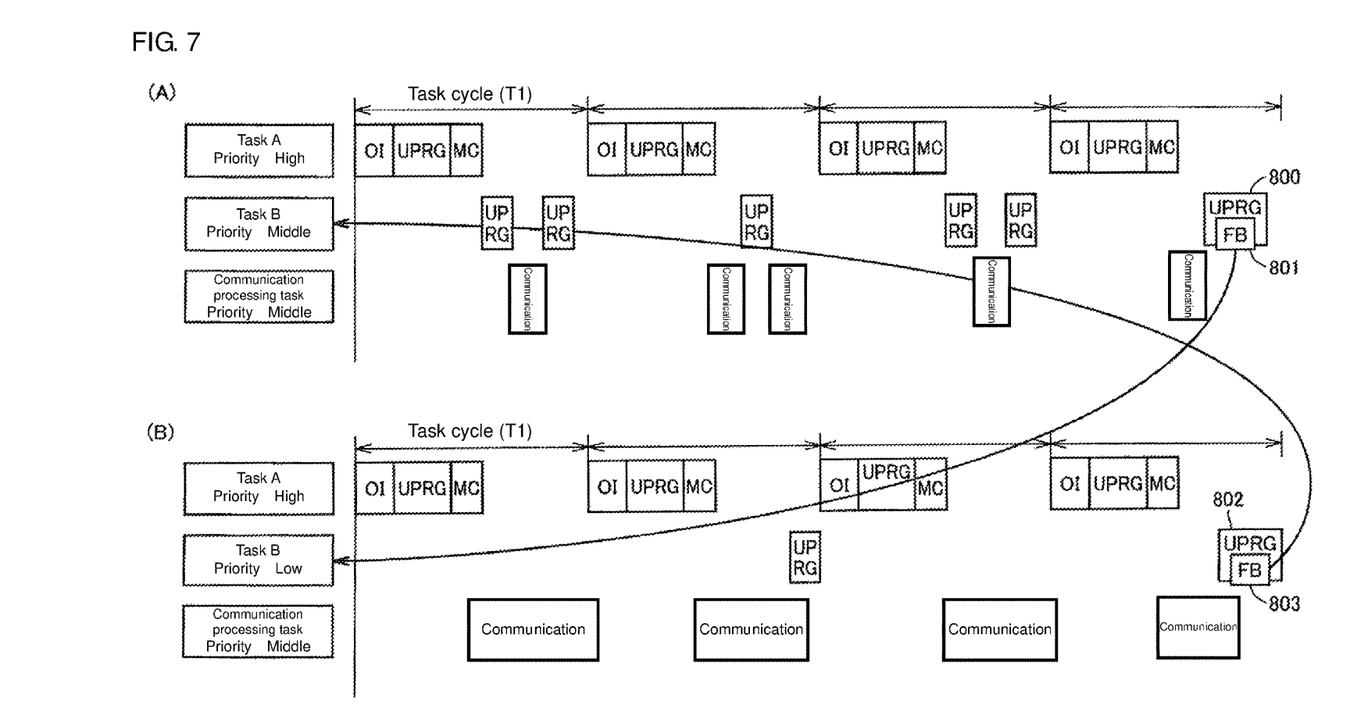
FIG. 7(A) and FIG. 7(B) are diagrams each illustrating an execution sequence of tasks when the CPU unit 104 executes an instruction contained in a user program to modify a priority of a task.

FIG. 7(A) and FIG. 7(B) are diagrams each illustrating an execution sequence of tasks when the CPU unit 104 executes an instruction contained in the user program to modify a priority of a task. FIG. 7(A) illustrates execution priorities of the tasks when a priority of the task "B" is set to the priority "Middle". FIG. 7(B) illustrates execution priorities of the tasks when a priority of the task "B" is set to the priority "Low". In FIG. 7(A) and FIG. 7(B), instructions (function blocks) contained in the user program are each denoted by the mark "FB". An instruction 801 and an instruction 803 are instructions for modifying execution conditions for a task.

As illustrated in FIG. 7(A), the CPU unit 104 executes a user program 800, and subsequently when the CPU unit 104 executes the instruction 801 contained in this user program 800, a priority of the task "B" is modified from the priority "Middle" to the priority "Low". After that, the CPU unit 104 executes the tasks as illustrated in FIG. 7(B). In FIG. 7(B), the CPU unit 104 executes a user program 802, and subsequently when the CPU unit 104 executes the instruction 803 contained in this user program 802, a priority of the task "B" is modified from the priority "Low" to the priority "Middle".

The control system 1 sets a priority of a task to different values, for example when individual devices produce products and when the PLC 100 receives a recipe from a server which indicates production parameters. In this way, the control system 1 can operate the PLC 100 to perform processes efficiently. More specifically, for example, suppose the control system 1 attempts to switch from a process of producing products to a process of receiving a recipe. For that purpose, the control system 1 sets a priority of the task "B" to be lower than a priority of a task "communication processing task". As a result, the PLC 100 can perform a communication process efficiently, thereby performing a process of receiving recipe data at a high speed. Moreover, suppose the control system 1 attempts to switch from the process of receiving a recipe to the process of producing products. For that purpose, the control system 1 sets a priority of the task "B" to be as high as or higher than a priority of the task "communication processing task". As a result, the devices can produce the products efficiently.

<F2. Modification of Task Cycle from User Program>

Figure 8:
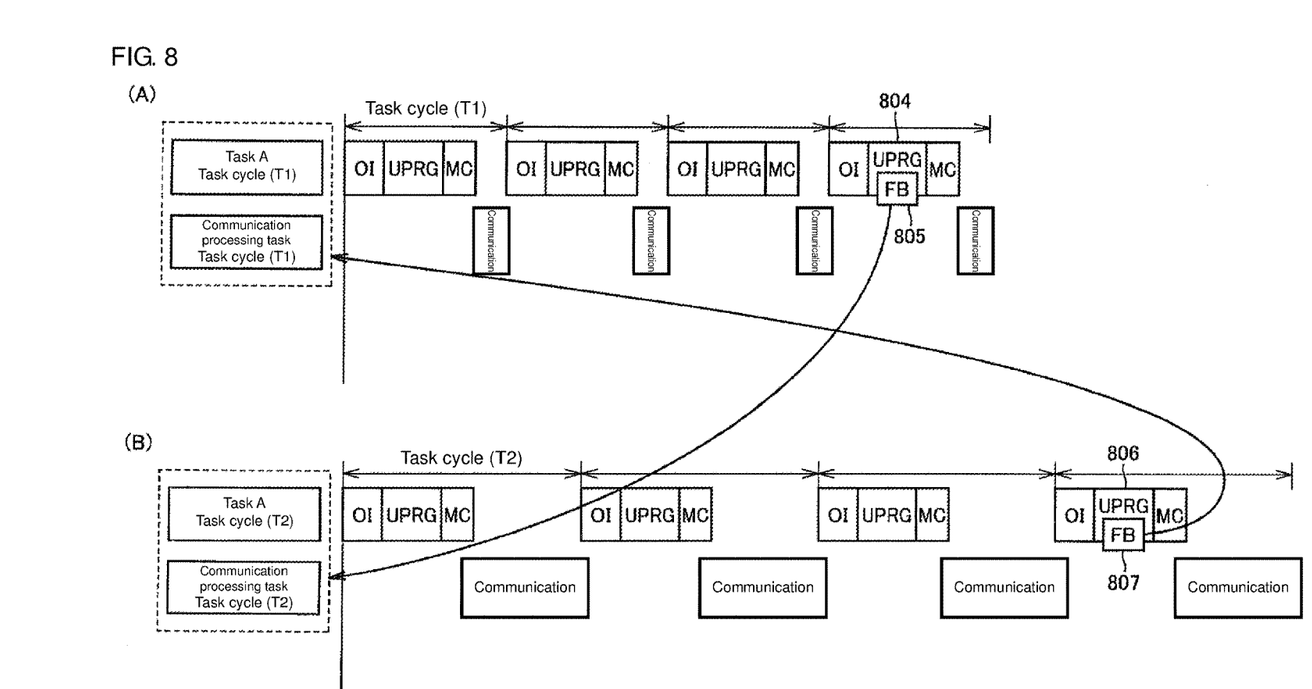
FIG. 8(A) and FIG. 8(B) are diagrams each illustrating an execution sequence of tasks when the CPU unit 104 executes an instruction contained in the user program to modify a cycle of tasks.

FIG. 8(A) and FIG. 8(B) are diagrams each illustrating an execution sequence of tasks when the CPU unit 104 executes an instruction contained in the user program to modify a cycle of tasks. FIG. 8(A) illustrates an execution sequence of the tasks when a cycle of the task "A" and a cycle of the task "communication processing task" are set to the cycle "T1". FIG. 8(B) illustrates an execution sequence of the tasks when a cycle of the task "A" and a cycle of the task "communication processing task" are set to a cycle "T2". In FIG. 8(A) and FIG. 8(B), the priority of the task "A" is set to be higher than the priority of the task "communication processing task". An instruction 805 and an instruction 807 are instructions for modifying execution conditions for a task.

As illustrated in FIG. 8(A), the CPU unit 104 executes the programs in accordance with the cycle of the tasks. First, the CPU unit 104 performs the process of the task "A" during the period of the cycle "T1" and then executes the task "communication processing task" within the remaining time after having completed the process of the task "A". The CPU unit 104 executes a user program 804, and subsequently when the CPU unit 104 executes the instruction 805 contained in the user program 804, a cycle of the task "A" and a cycle of the "communication processing task" are modified from the cycle "T1" to the cycle "T2". After that, the individual tasks are executed as illustrated in FIG. 8(B).

As can be seen from the comparison between FIG. 8(A) and FIG. 8(B), a longer cycle is set in each task in FIG. 8(B). Therefore, the task "communication processing task" is executed over a longer period in the state of FIG. 8(B) than in the state of FIG. 8(A). In other words, the CPU unit 104 communicates with an external apparatus (e.g., database device 400) over a longer period in the state of FIG. 8(B) than in the state of FIG. 8(A).

In FIG. 8(B), the CPU unit 104 executes a user program 806, and subsequently when the CPU unit 104 executes the instruction 807 contained in the user program 806, a cycle of the task "A" and a cycle of the "communication processing task" are modified from the cycle "T2" to the cycle "T1".

When the control system 1 sets up or adjusts devices, for example, there are cases where it is necessary to adjust the balance between a control process and a communication process for each device in accordance with a situation. In this case, by adjusting the cycle of a task for controlling each device (task "A", etc. in the examples of FIG. 8(A) and FIG. 8(B)), the process time of the task "communication processing task" can be adjusted.

As an example, when control system 1 is designed, the cycle of a task may be set to a short time in order to assign a higher priority to the control process for the device. As another example, when it is necessary to perform the communication process with some margin ensured, a cycle of a task may be set to a long time. In the examples illustrated in FIG. 8(A) and FIG. 8(B), a task cycle can be modified from the user program. Thus, the control system 1 can finely adjust a cycle of a task when setting up or adjusting devices, for example, thereby proceeding with a setup process, an adjustment process, and other processes efficiently.

<F3. Modification of Task Priority and Task Cycle from User Program>

Figure 9:
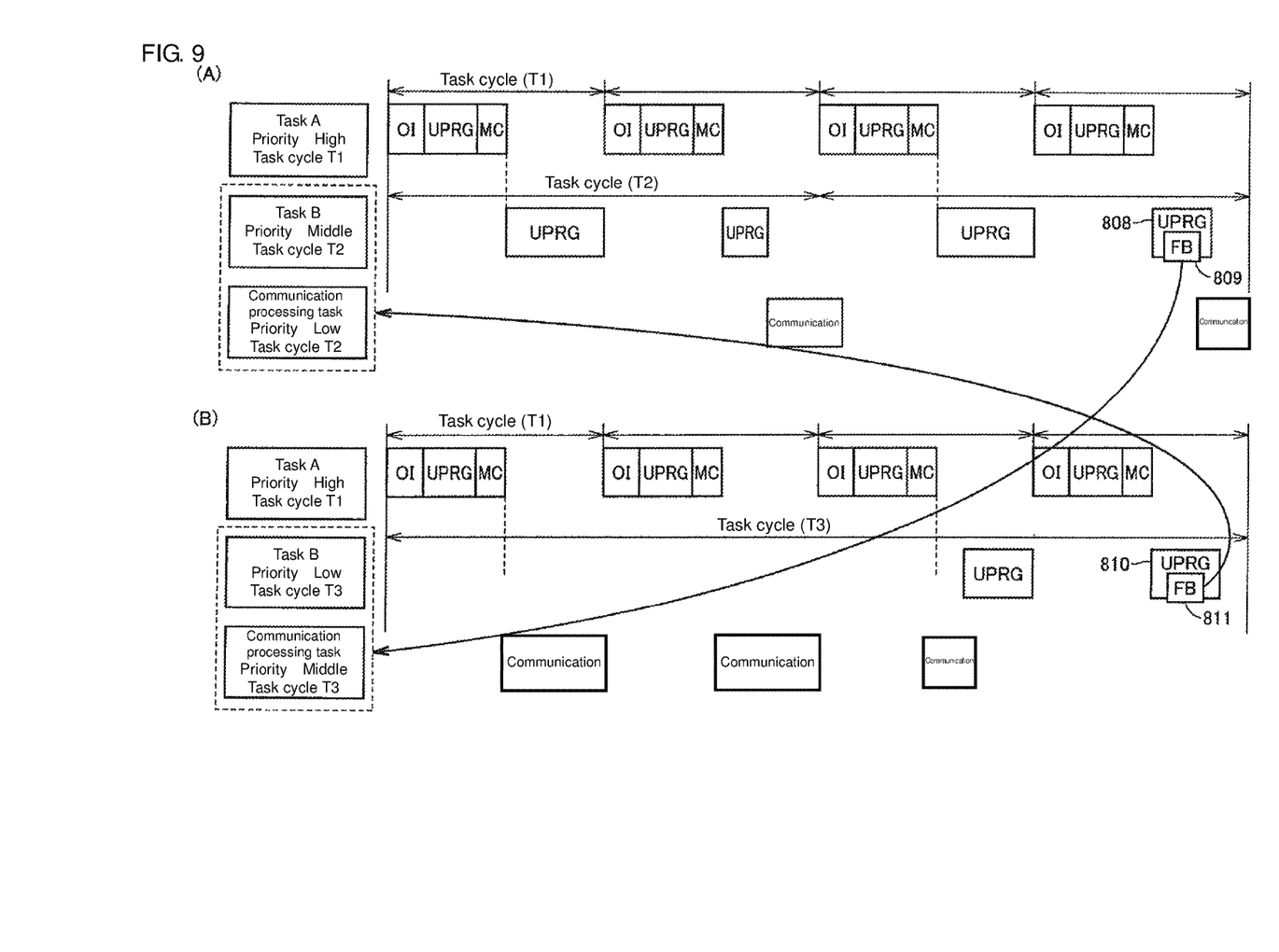
FIG. 9(A) and FIG. 9(B) are diagrams each illustrating an execution sequence of tasks when the CPU unit 104 executes an instruction contained in the user program to modify priorities and a cycle of tasks.

FIG. 9(A) and FIG. 9(B) are diagrams each illustrating an execution sequence of tasks when the CPU unit 104 executes an instruction contained in the user program to modify priorities and a cycle of tasks. FIG. 9(A) illustrates an execution sequence of the task "A" with the priority "High" and the cycle "T1", the task "B" with the priority "Middle" and the cycle "T2", and the task "communication processing task" with the priority "Low" and the cycle "T2". FIG. 9(B) illustrates an execution sequence of the task "A" with the priority "High" and the cycle "T1", the task "B" with the priority "Low" and the cycle "T3", and the task "communication processing task" with the priority "Low"

and the cycle "T3". An instruction 809 and an instruction 811 are instructions for modifying execution conditions for a task.

As illustrated in FIG. 9(A), the CPU unit 104 performs a user program 808, and subsequently when the CPU unit 104 executes the instruction 809 contained in this user program, a priority of the task "B" is modified from the priority "Middle" to the priority "Low" and a cycle of the task "B" is also modified from the cycle "T2" to the cycle "T3". When the CPU unit 104 executes the instruction 809 contained in the user program, a priority of the task "communication processing task" is modified from the priority "Low" to the priority "Middle" and a cycle of the task "communication processing task" is also modified from the cycle "T2" to the cycle "T3". After that, the individual tasks are executed as illustrated in FIG. 9(B).

As can be seen from the comparison between FIG. 9(A) and FIG. 9(B), a longer cycle is set in each of the task "B" and the task "communication processing task" in FIG. 9(B), and a higher priority is set in the task "communication processing task" in FIG. 9(B).

In FIG. 9(B), the CPU unit 104 performs a user program 810, and subsequently when the CPU unit 104 executes the instruction 811 contained in this user program 810, a priority of the task "B" is modified from the priority "Low" to the priority "Middle" and a cycle of the task "B" is also modified from the cycle "T3" to the cycle "T2". Moreover, a priority of the task "communication processing task" is modified from the priority "Middle" to the priority "Low", and a cycle of the task "communication processing task" is also modified from the cycle "T3" to the cycle "T2".

As compared to FIG. 7(A) and FIG. 7(B), when a task to which a lower priority is to be assigned operates periodically, its priority is set to be lower but its cycle is set to be longer. As a result, the task to which a lower priority has been assigned can operate without a risk of exceeding its intended task period.

<G. Effect>

A control system normally presets priorities and cycles of programs and executes the programs in accordance with this setting. In some cases, this system needs to modify priorities and cycles of the programs in accordance with a situation. As an example, different priorities and cycle times may be set in a program when the control device transmits/receives data to or from a host device (database device, server, etc.) to which the control device is connected via a network, when the control device sets up devices, and when the control device needs to operate at a high speed, for example in order to produce products. The control system 1 described in this embodiment enables priorities of programs to be executed and a cycle time over which a control device operates to be modified even when the control program 230 is in operation. The control system 1 thereby can operate efficiently.

The embodiment disclosed herein should be constructed as being exemplary and not being restrictive in every respect. The scope of the present invention is defined by the claims, not the foregoing embodiment, and intended to include the meaning of equivalents of the claims and all the possible modifications and variations that fall within the scope thereof.

DESCRIPTION OF SYMBOLS 1 control system
10 detection switch
20 relay
30 servomotor driver
32 motor
100 PLC
102 power supply unit
104 CPU unit
106 I/O unit
108 PLC system bus
110 field bus
112 network
114 connection cable
120 processor
122 chip set
124 system clock
126 main memory
128 nonvolatile memory
130 USB connector
140 PLC system bus controller
142, 152, 162 buffer memory
144 PLC system bus control circuit
146, 156, 166 DMA control circuit
148 PLC system bus connector
150 field bus controller
154 field bus control circuit
158 field bus connector
160 host communication controller
164 host communication control circuit
168 host communication connector
170 memory card interface
172 memory card
192 DB access processing program
194 input/output processing program
196 interface processing program
200 real-time OS
212 scheduler
214 output processing program
216 input processing program
218 I/O processing program
220 other system programs
230 control program
232 sequence instruction computing program
234 motion computing program
236 user program
242 task execution condition management table
300 support device
310 display
400 database device

The invention claimed is:

1. A controller that controls a target apparatus, the controller comprising:
   a memory comprising a storage section configured to store a plurality of programs including a user program and task information indicating an execution condition for a task; and
   a processor coupled to the memory, the processor configured by the plurality of programs to perform operations comprising operation as a control section configured to execute the plurality of programs periodically in accordance with the execution condition indicated by the task information,
   wherein:
   the execution condition for the task indicated by the task information comprises a cycle of the task to be executed and a priority of the task to be executed,
   the user program comprises a setting instruction for modifying the execution condition for the task, the setting instruction comprising at least one of an instruction for modifying the priority of the task and an instruction for modifying the cycle of the task such that the priority level of the task and the length of the cycle are set in inverse relation,
   the processor of the controller is configured by the plurality of programs to perform operations such that operation as the control section further comprises operation as the control section to:

control the target apparatus by periodically executing the user program, updating the task information in the storage section by executing the setting instruction contained in the user program, and executing the plurality of programs in accordance with the modified execution condition for the task.

2. The controller according to claim 1, wherein the processor of the controller is configured by the plurality of the programs to perform operations such that operation as the control section comprises operation as the control section to execute the plurality of programs periodically in accordance with the priority of the task, the setting instruction contains an instruction for modifying the priority of the task, and the processor of the controller is configured by the plurality of the programs to perform operations such that operation as the control section further comprises operation as the control section to update the task information by executing the instruction for modifying the priority of the task which is contained in the user program to modify the priority of the task associated with the instruction.

3. The controller according to claim 1, wherein the setting instruction contains an instruction for modifying the cycle of the task to be executed, and the processor of the controller is configured by the plurality of the programs to perform operations such that operation as the control section further comprises operation as the control section to update the task information by executing the instruction for modifying the cycle of the task which is contained in the user program to modify the cycle of the task associated with the instruction.

4. The controller according to claim 1, wherein the processor of the controller is configured by the plurality of the programs to perform operations such that operation as the control section further comprises operation as the control section to execute the plurality of programs periodically in accordance with the priority and cycle of the task, the setting instruction contains at least one of an instruction for modifying the priority of the task and an instruction for modifying the cycle of the task, and the processor of the controller is configured by the plurality of the programs to perform operations such that operation as the control section further comprises operation as the control section to update the task information by executing the instruction for modifying the priority of the task and the instruction for modifying the cycle of the task which are contained in the user program to modify at least one of the priority and cycle of the task associated with the instruction.

\* \* \* \* \*